United States Patent Office 3,620,106
Patented Nov. 16, 1971

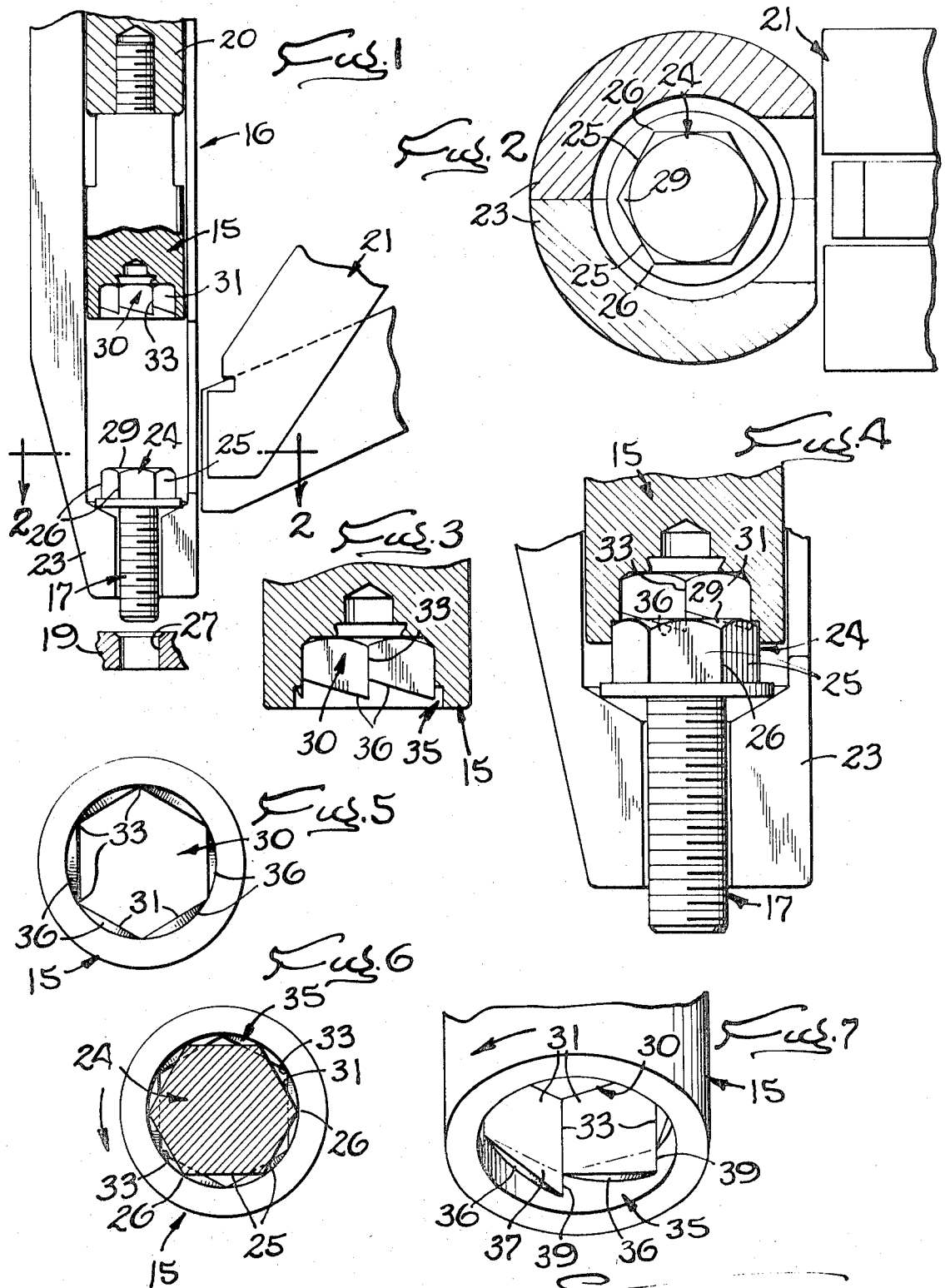

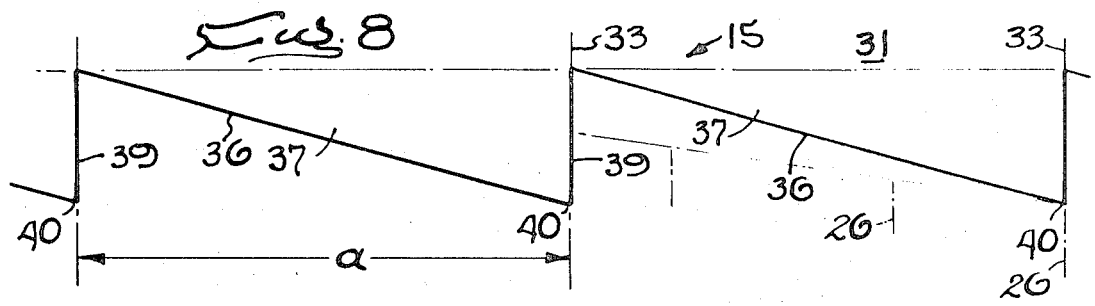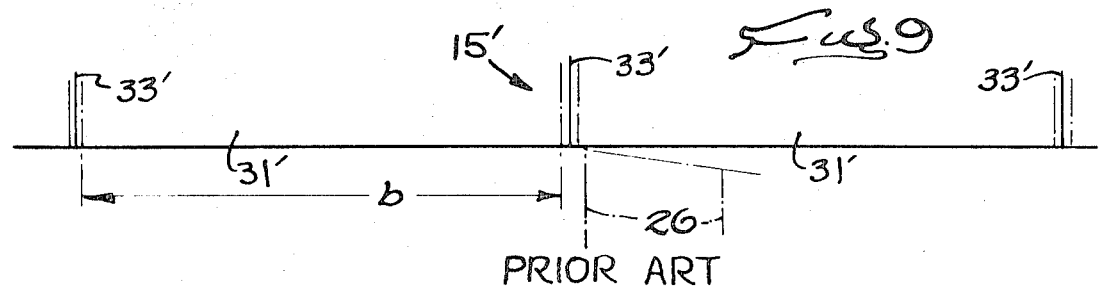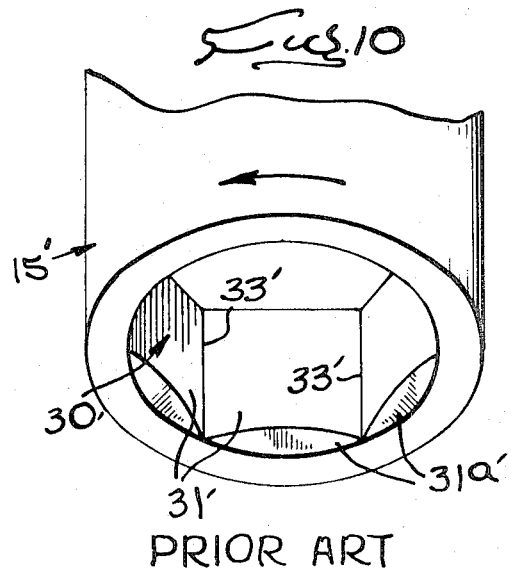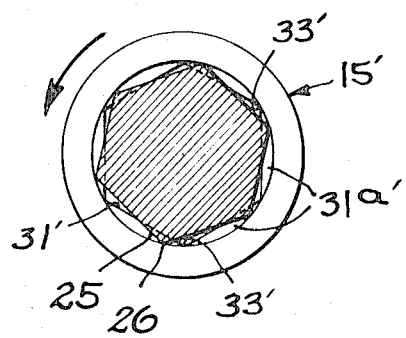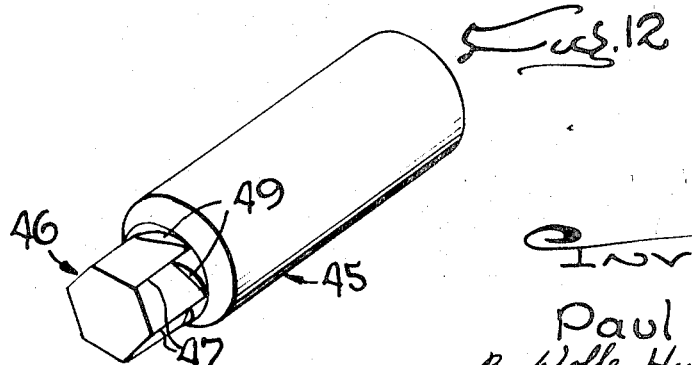

3,620,106
WRENCH-TYPE SOCKET
Paul H. Dixon, Belvidere, Ill., assignor to Dixon
Automatic Tool, Inc., Rockford, Ill.
Filed Dec. 16, 1968, Ser. No. 783,865
Int. Cl. B25b 13/06
U.S. Cl. 81—121    3 Claims

ABSTRACT OF THE DISCLOSURE

Usable with an automatic assembly device, a wrench-type socket for driving a screw with a hexagonal head includes a hexagonal recess for drivingly engaging the head and a cylindrical counter-recess for telescopically receiving the head regardless of the relative angular positions of the socket and the screw. The bottom of the counter-recess is formed as a series of angularly spaced and inclined relief surfaces which pilot the head into driving engagement with the recess and which allow the socket to turn into driving engagement with the head while continuously telescoping over the head.

BACKGROUND OF THE INVENTION

This invention relates generally to wrench-type sockets and, more particularly, to sockets which are used in conjunction with high speed automatic assembly devices to drive threaded fasteners formed with a polygonal shape. With such an assembly device cycling in rapid automatic sequence, a fastener and a threaded workpiece are delivered to an assembly station, a rapidly rotating socket with a polygonal-shaped recess is advanced toward and telescoped over the fastener, and the socket drivingly engages and turns the fastener to connect the latter threadably to the workpiece.

Because the socket rotates and advances at extremely rapid rates, only a very short time interval is available for the socket to mate angularly and move into proper face-to-face driving engagement with the fastener. Most present day commercially available sockets frequently fail to mate quickly enough with the fastener and often move into improper driving engagement with the fastener to throw the latter from the assembly device, to mar or score the fastener, or to damage the recess in the socket.

SUMMARY OF THE INVENTION

The primary aim of the present invention is to provide a new, improved and competitively priced wrench-type socket which overcomes the foregoing disadvantages resulting from previous sockets and which can mate in proper driving engagement with the fastener more reliably and much quicker than prior sockets. Another object is to provide a novel and comparatively inexpensive socket capable of advancing toward and telescoping over the fastener while simultaneously turning into positive driving engagement with the fastener so as to increase many times over the time available for the socket to seek out proper driving engagement.

In a more detailed sense, the invention resides in the novel formation of the socket with a recess and a counter-recess and in the unique construction of the bottom of the counter-recess to permit simultaneous telescoping and turning of the socket on the fastener and to pilot the fastener into proper driving engagement with the socket.

Other objects and advantages of the invention will become apparent from the following detailed description when taken in connection with the accompanying drawings.

BRIEF DESCRIPTION OF THE DRAWINGS

FIG. 1 is a side elevation of a new and improved socket embodying the novel features of the present invention, the socket being shown in conjunction with an automatic assembly device and being shown with parts broken away for purposes of clarity.

FIG. 2 is an enlarged fragmentary cross-section taken substantially along the line 2—2 of FIG. 1.

FIG. 3 is an enlarged view of part of the socket shown in FIG. 1.

FIG. 4 is an enlarged fragmentary view similar to FIG. 1 but showing the socket in a moved position.

FIG. 5 is an end view of the socket as seen from the open end of the socket.

FIG. 6 is a cross-section showing the socket beginning to telescope over the fastener.

FIG. 7 is a fragmentary perspective view of the socket.

FIG. 8 is a rolled-out view of a part of the socket and schematically illustrating the action of the socket in telescoping over the fastener.

FIG. 9 is a rolled-out view of a typical standard presently available and commercially used socket.

FIG. 10 is a fragmentary perspective view of a standard socket.

FIG. 11 is a view showing a standard socket improperly engaging a fastener.

FIG. 12 is a perspective view of a tool for making the new and improved socket of the present invention.

DESCRIPTION OF THE PREFERRED EMBODIMENT

As shown in the drawings for purposes of illustration, the invention is embodied in a wrench-type socket 15 (FIG. 1) which is particularly adapted for use with an automatic assembly device 16 to drive threaded fasteners 17 into successive workpieces 19 delivered to an assembly station, only one fastener and one workpiece being shown herein. Suitable feeding mechanism (not shown) delivers the workpieces to the assembly device one at a time to receive the fasteners.

The assembly device 16 includes a power-driven operator 20 connected to rotate the socket 15 counterclockwise (FIG. 7) at a speed such as 2,000 r.p.m. while simultaneously advancing the socket downwardly from the position shown in FIG. 1 and into telescoping relation with the fastener 17 (see FIG. 4) to turn and threadably connect the latter to the workpiece 19. Fasteners are delivered one at a time to the assembly device at a rate of about 60 per minute by a transfer mechanism 21 (FIG. 1), and each is held between a pair of spring-biased jaws 23 as the socket moves rapidly through its downward stroke, telescopes with and rotates the fastener, and drives the fastener toward the workpiece. The jaws are spread apart automatically to release the fastener as the latter becomes threaded to the workpiece. Reference may be had to U.S. Pat. 2,989,996 for a more detailed description of an automatic assembly device suitable for use with the socket of the present invention.

While the fastener 17 could be a threaded bolt or nut with a driving portion of any substantially symmetrical polygonal shape, it herein is shown as a threaded screw with a hexaognal head 24 (FIGS. 2 and 4) which is defined by six angularly spaced flats 25 divided by external corners 26, the screw being adapted for threading into a hole 27 (FIG. 1) in the workpiece 19. The upper face of the head usually is chamfered downwardly at the corners as indicated at 29 in FIGS. 1 and 2 to reduce the sharpness of the upper points of the corners.

The socket 15 is a body made of hardened steel and is formed with a central polygonal recess 30 (FIGS. 3, 5 and 7) corresponding closely in size to that of the head 24 and defined in this particular instance by six angulated driving sides or walls 31 which form at the junctions of their side edges a series of angularly spaced internal corners 33. When the socket is telescoped fully over the head 24, the external corners 26 of the head fit into the internal corners 33 of the recess with the walls 31 drivingly engaging the flats 25 to rotate the screw 17 in unison with the socket.

In order for the walls 31 to move into proper driving engagement with the flats 25, the internal corners 33 of the recess 30 must angularly mate or aline with the external corners 26 of the head 24 before the socket 15 can telescope fully over the head. Because the socket rotates and advances at very high speeds, only a very short time is available within which the internal and external corners can mate angularly to permit continued downward telescoping of the socket. If the sets of corners fail to mate almost immediately after the socket first engages the head, the socket may move into improper driving engagement with the head and interfere with the successful operation of the assembly device 16.

What is meant by "improper driving engagement" can be explained best by referring to a typical standard presently available and commercially used socket 15' shown in FIGS. 9 to 11, parts of the standard socket corresponding to those of the socket 15 of the present invention being indicated by the same but primed reference numerals. The standard socket 15' also includes a recess 30' with angulated side walls 31' and angularly spaced internal corners 33'. The walls 31' extend to the lower open end of the recess and are formed with horizontally extending lower surfaces 31a' which usually are beveled slightly inwardly toward the axis of the socket to facilitate guiding of the screw head 24 into the recess 30'.

As the standard socket 15' first approaches and engages the screw head 24, the internal corners 33' of the recess 30' possibly may be misalined angularly with the external corners 26 of the head by as much as about 60 degrees, such a condition being illustrated in FIG. 11 and also schematically in FIG. 9 which shows a partial rolled-out view of the walls 31' and the corners 33'. Accordingly, the socket 15' must be turned through almost 60 degrees before the recess can telescope fully over the head and before the internal and external corners aline to permit further downward advancement of the socket. Being required to turn through such a large angle before becoming perfectly mated with the head 24, the rapidly advancing socket 15' often moves downwardly and drivingly engages the head improperly as shown in FIG. 11 before the internal corners can turn into alinement with the external corners. In other words, the socket 15' and the head 24 become drivingly engaged in the relative angular positions shown in FIG. 11 in which the external corners 26 of the head contact the faces of the walls 31' instead of fitting into the internal corners 33' of the recess 30'. This results in frictional and improper corner-to-wall driving engagement between the screw 17 and the socket as opposed to a positive and proper flat-to-wall driving engagement and, as a result, the screw begins to turn prematurely and often turns eccentricaly with respect to the socket. The chances of the standard socket 15' moving into improper driving engagement are increased considerably by the chamfers 29 formed at the corners 26 of the head 24 since such chamfers facilitate slight telescoping of the socket onto the head with a frictional fit before the internal corners 33' can turn into angular alinement with the external corners.

Once the standard socket 15' improperly engages and begins turning the screw 17 frictionally, it is virtually impossible for the screw to turn relative to the socket and into proper driving engagement. Being turned before the socket is in full driving engagement and being turned with an eccentric or orbiting motion, the screw can be forced prematurely through the jaws 23 and thrown away from the assembly device 16 with considerable velocity or can be threaded partially into the workpiece 19 at an angle. As a result, some workpieces may be transferred from beneath the socket with no screws at all while others will include incorrectly threaded screws. In addition, improper driving engagement of the standard socket 15' with the screw often causes scoring or marring of the head 24 and eventually will cause wearing of the recess 30' and corners 33' of the socket and scoring of the jaws 23.

In accordance with the present invention, the socket 15 is constructed in a novel manner to enable it to telescope progressively downwardly onto the screw head 24 while simultaneously turning into positive driving engagement with the head thereby to increase the time available for the socket to engage the head properly and to insure that the socket will mate wall-to-flat with the head of every screw delivered to the assembly device 16. For these purposes, an enlarged counter-recess 35 (FIGS. 3 and 7) is formed in the end of the socket to enable the socket to telescope initially over the head with sliding clearance regardless of the relative angular positions of the socket and the head. The bottom surface of the counter-recess is shaped to allow continued sliding telescoping of the socket over the head after initial entry of the latter and then to drivingly engage the external corners 26 and pilot the latter axially into the internal corners 33 when the socket ultimately turns into angular alinement with the head. With this arrangement, the socket has significantly more time to mate with the head since the socket can continue to advance and telescope relative to the head while seeking angular alinement and proper driving engagement. The socket thus is more reliable and results in more trouble-free operation of the assembly device.

As shown most clearly in FIGS. 3, 5 and 7, the counter-recess 35 is of generally cylindrical cross-section and is equal in diameter to the major diameter of the recess 30 or to the distance between opposing internal corners 33. The diameter of the counter-recess thus is greater than the minor diameter of the recess, i.e., the distance between the midpoints of opposing walls 31.

The bottom of the counter-recess 35 is formed as a series of angularly spaced relief surfaces 36 (FIGS. 3, 5 and 7) which are inclined progressively upwardly and away from the open lower end of the counter-recess in the direction of rotation of the socket 15. Herein, the relief surfaces 36 are inclined at an angle of approximately 15 degrees relative to the horizontal and, with the surfaces inclined, the leading side edge (in relation to direction of rotation) of each wall 33 is of greater axial length than its trailing side edge such that the lower end of the leading side edge is disposed nearer the open end of the counter-recess 35 when the corresponding end of the trailing side edge. Also, it will be seen that the inclined relief surfaces 36, in effect, result in the bottom of the counter-recess 35 being formed as a series of staggered teeth 37 (FIG. 8) located at the lower end of and spaced angularly around the recess 30, each tooth having a leading edge 39 alined vertically with and forming a smooth continuation of one of the internal corner 33 of the recess. Thus, each relief surface 36 slopes progressively from the leading edge 39 of one tooth 37 to the leading edge of the next adjacent tooth and establishes between the teeth and within the lower end of the recess 30 an arcuate clearance which is bounded on its outer side by the cylindrical wall of the counter-recess 35 and which progressively increases axially or upwardly as it proceeds around the socket in a direction opposite the direction of rotation.

Upon advancing downwardly toward the screw 17, the new and improved socket 15 immediately can telescope over the head 24 with a loose fit regardless of the relative angular positions of the socket and the head since the diameter of the counter-recess 35 is greater than the major diameter of the head. Accordingly, there is no danger of the head initially jamming into the socket in improper driving engagement. With continued downward advancement of the socket, the extreme lower corners 40 (FIG. 8) of the leading edges 39 of the teeth approach the external corners 26 of the head. If the two sets of corners 26 and 40 are just approaching perfect angular alinement at the exact instant they meet (see the corner 26 at the extreme right-hand portion of FIG. 8), the leading edges 39 of the teeth 37 simply engage the external corners 26 drivingly and pilot the corners axially into the alined internal corners 33 of the recess 30 as downward advancement of the socket continues. If, however, the lower corners 40 of the leading edges 39 of the teeth 37 are angularly misalined with the external corners 26 of the head as ordinarily is the case, the inclined relief surfaces 36, and the clearances established thereby within the recess 30, allow the socket to continue to telescope downwardly over the head as shown schematically in FIG. 8 while simultaneously turning relative to the head even though the lower corners 40 of the teeth have moved below the external corners 26 of the head. Accordingly, with further turning of the downwardly advancing socket, the leading edges 39 of the next approaching teeth drivingly engage the external corners 26 of the head to start the screw 17 turning in unison with the socket and to pilot the external corners 26 axially into the main internal corners 33 of the recess 30 as the socket continues to advance downwardly. Thus, the socket is free to turn into perfectly alined driving engagement with the head while telescoping over the head and without danger of improperly jamming on the head in wall-to-corner engagement.

From the foregoing, it will be apparent that the new and improved socket 15 of the present invention is capable of turning through an angle $a$ (FIG. 8) of almost 60 degrees while telescoping continuously over the head 25 and while seeking proper driving engagement with the head. This is in contrast to the standard socket 15' which often must physically turn through an angle $b$ (FIG. 9) as much as about 60 degrees before and until angular alinement is achieved to allow continued full telescoping of the socket into proper driving engagement. Thus, the socket 15 of the present invention has almost sixty times more available time to move into proper driving engagement. The chances of the screw 17 being thrown from the assembly device 16, being improperly threaded or being damaged thus are greatly reduced.

It will be appreciated that the principles of the invention are applicable equally well to sockets other than those used with automatic assembly devices and also can be applied to wrenches of the type commonly referred to as box-end wrenches. Also, the invention will find use with other types of telescoping male and female members other than a wrench-type socket and a polygon-headed screw. For example, the recess 30, the counter-recess 35 and the inclined relief surfaces 36 could be formed in the socket of an Allen screw adapted to be driven by an Allen wrench.

In addition to achieving significant operational advantages, the improved socket 15 can be manufactured at a cost which is generally competitive with standard sockets. A suitable tool 45 for forming the recess 30, the counter-recess 35 and the inclined relief surfaces 36 in the socket is shown in FIG. 12 and, as illustrated, includes a hexagonal-shaped cutting portion 46 with sharp cutting edges 47. Between and adjacent the inner ends of the cutting edges is a series of angularly spaced and inclined die faces 49.

Initially, the socket 15 is formed with a cylindrical recess and counter-recess corresponding approximately in diameters to the minor diameter and the full diameter of the recess 30 and the counter-recess 35, respectively. Then, the tool 45 is telescoped into the recess such that the cutting portion 46 and cutting edges 47 cut away the cylindrical wall of the recess with a broaching action to form the walls 31 and internal corners 33. With continued telescoping of the tool, the die faces 49 impinge upon and coin the metal at the bottom of the counter-recess 35 to form the inclined relief surfaces 36. Thus, the socket can be formed with a relatively simple operation.

I claim as my invention:

1. A socket-type wrench adapted to be advanced into telescoping relation with and turned to drive a substantially symmetrical polygonal member having a predetermined major diametrical dimension and having a series of angularly spaced external corners, said wrench comprising a body having a recess of polygonal cross-section formed by a series of angulated driving walls defining at their junctions angularly spaced internal corners correlated in number and spacing with the number and spacing of the external corners on said member, said recess having a major diametrical dimension just slightly greater than the major diametrical dimension of said member, a circular counter-recess formed in one end of said body and communicating with said recess, said counter-recess having a diameter equal to the major diametrical dimension of said recess, and the leading and trailing side edges of each wall being straight and parallel throughout their length with the leading side edge being of greater axial length than the trailing side edge to locate the end of the leading side edge nearer the open end of the counter-recess than the end of the trailing side edge and to cause the bottom of the counter-recess to be formed as a series of angularly spaced inclined surfaces facing in the same general direction as the open end of the counter-recess, each inclined surface extending completely across the adjacent wall and diverging continuously away from the open end of the counter-recess along its entire length as it proceeds from the leading side edge to the trailing side edge of such wall.

2. A socket-type wrench adapted to be advanced into telescoping relation with and turned to drive a substantially symmetrical polygonal member having a predetermined major diametrical dimension and having a series of angularly spaced external corners, said socket comprising a body having an internal recess of polygonal cross-section for receiving the member and formed by a series of angulated driving walls for engaging the member to transmit torque to the latter when said socket is turned, said walls defining at their junctions and within the recess a series of angularly spaced internal corners correlated in number and spacing with the number and spacing of the corners on said member, said recess having a major diametrical dimension just slightly larger than the major diametrical dimension of said member, a circular counter-recess formed in one end of said body and communicating with said recess, said counter-recess having a diameter equal to the major diametrical dimension of said recess and greater than the major diametrical dimension of said member to permit initial telescoping of said member into said counter-recess during advancement of said socket regardless of the relative angular positions of the socket and the member, and the bottom of said counter-recess being formed as a series of staggered teeth spaced around said recess and having leading edges alined axially with and forming continuations of said internal corners to turn into driving engagement with the corners of said member after initial telescoping of said member into said counter-recess, each of said teeth having an inclined relief face sloping progressively away from its leading edge and diverging continuously from the open end of the counter-recess to define a clearance bounded on its outer side by the arcuate wall of the counter-recess and progressively and continuously increasing axially within the recess to permit continued advancement and turning of said socket relative to said member until the leading edges of the teeth drivingly engage the corners of the member and pilot such corners axially into said internal corners.

3. A female member adapted to telescope slidably over and turn in unison with a male member formed with a polygonal cross-section and with a predetermined major diametrical dimension, said female member comprising a body having a recess of polygonal cross-section correlated with that of the male member and formed by a series of angulated driving walls, said recess having a major diametrical dimension just slightly larger than the major diametrical dimension of said male member, a circular counter-recess formed in one end of said body and communicating with said recess, said counter-recess having a diameter equal to the major diametrical dimension of said recess, and the two side edges of each wall being straight and parallel throughout their length with the end of one side edge being located nearer the open end of the counter-recess than the end of the other side edge to cause the bottom of the counter-recess to be formed as a series of angularly spaced inclined surfaces facing in the same general direction as the open end of the counter-recess, each inclined surface extending completely across the adjacent wall and diverging continuously away from the open end of the counter-recess along its entire length.

References Cited
UNITED STATES PATENTS

| | | | |
|---|---|---|---|
| 2,465,048 | 3/1949 | Wentling | 81—121-1 |
| 2,202,240 | 5/1940 | Trotter | 81—121-1 |

JAMES L. JONES, JR., Primary Examiner